Dec. 8, 1970   L. U. ALSRUHE   3,545,823
BEARING FOR SLIDE MEMBER
Filed Oct. 1, 1968   2 Sheets-Sheet 1
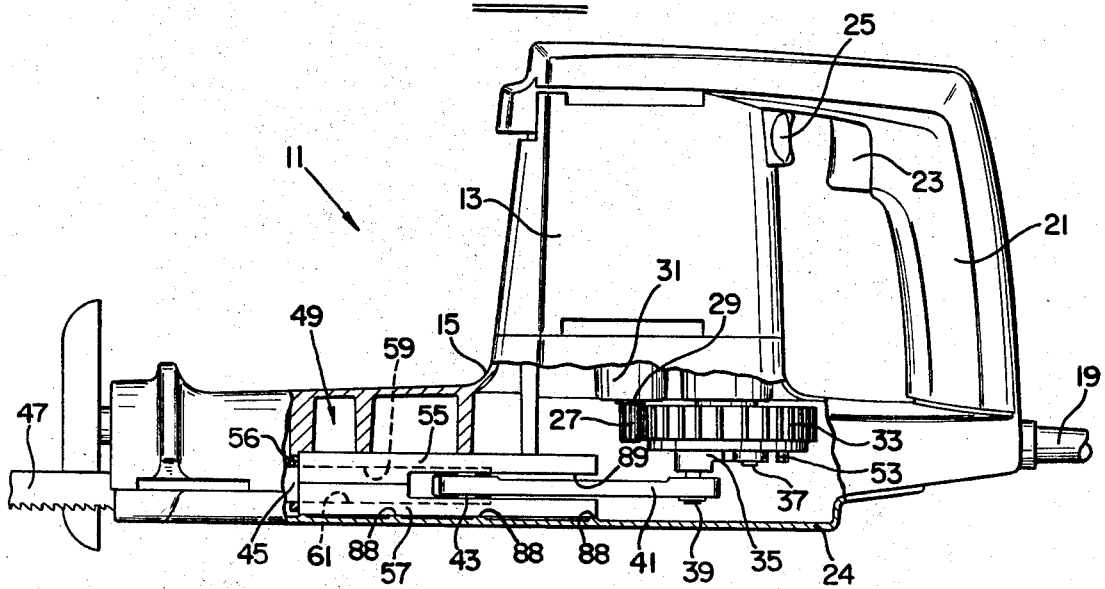
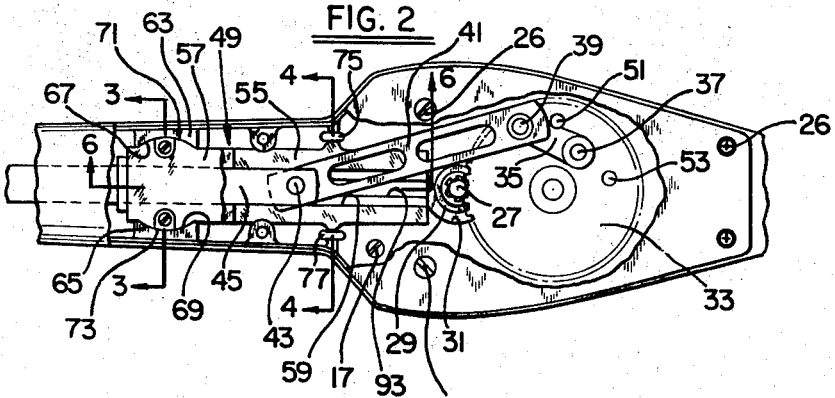
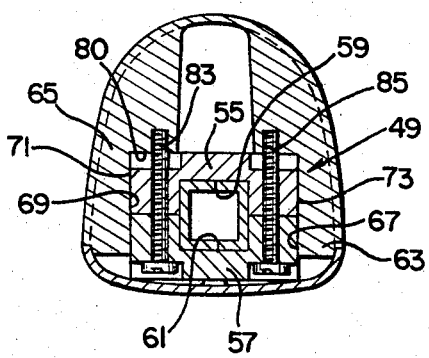
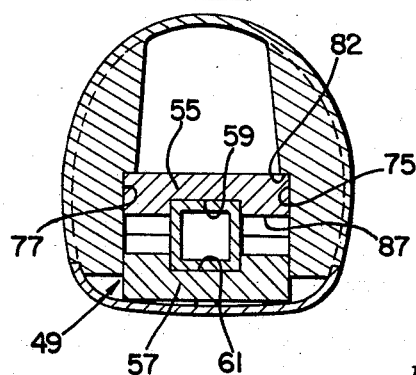
INVENTOR
LEONARD U. ALSRUHE
BY *Joseph R. Slotnik*
ATTORNEY Dec. 8, 1970  L. U. ALSRUHE  3,545,823
BEARING FOR SLIDE MEMBER
Filed Oct. 1, 1968
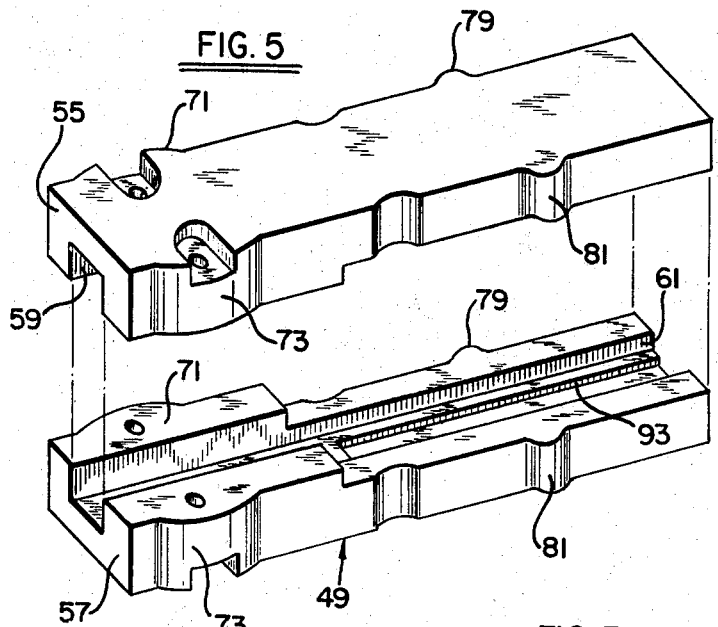
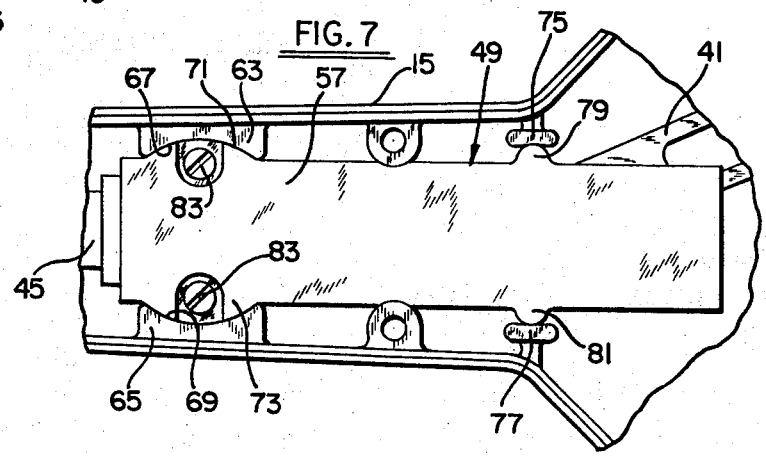
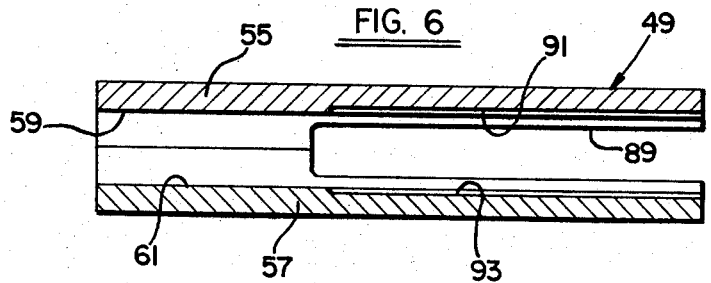
INVENTOR
LEONARD U. ALSRUHE
BY
ATTORNEY

United States Patent Office 3,545,823
Patented Dec. 8, 1970

3,545,823
BEARING FOR SLIDE MEMBER
Leonard U. Alsruhe, Towson, Md., assignor to The Black and Decker Manufacturing Company, Towson, Md., a corporation of Maryland
Filed Oct. 1, 1968, Ser. No. 764,202
Int. Cl. F16c *21/00;* B27b *19/08*
U.S. Cl. 308—3
9 Claims

ABSTRACT OF THE DISCLOSURE

The device disclosed herein is a portable power operated sabre saw which includes a housing encasing an electric motor and transmission adapted to impart reciprocatory movement to a slide to which a saw blade is attached. The transmission is constructed to provide different length blade strokes and different blade speeds when the motor is reversed. The slide is guided by novel bearing means supported in a novel fashion within the housing.

SUMMARY OF THE INVENTION

The present invention deals specifically with novel bearing means for a reciprocating slide and with a novel mounting construction therefor adapted for use in, for example, a reciprocating tool. The mounting construction includes means formed on a housing which properly locates the bearing means with respect to other parts of the device, and the bearing means is constructed for easy assembly and disassembly and to accommodate movement of parts associated with the slide it guides.

Main objects, therefore, of the present invention are to provide a novel bearing construction and mount therefor which provides for easy assembly and disassembly of the parts, which provides for accurate positioning of the bearing relative to other parts and which minimizes manufacturing tolerance requirements.

Further objects are to provide a novel bearing construction and mount therefor which is relatively inexpensive to manufacture, rugged in construction and reliable in use.

Other objects and advantages of the invention will become more apparent from a consideration of the detailed description taken together with the drawings annexed hereto.

BRIEF DESCRIPTION OF THE DRAWINGS

FIG. 1 is a side elevational view, partly broken away, illustrating a portable electric sabre saw embodying the present invention;

FIG. 2 is a bottom plan view of a portion of the structure of FIG. 1;

FIG. 3 is an enlarged sectional view of FIG. 2 taken along the line 3—3 thereof;

FIG. 4 is an enlarged sectional view of FIG. 2 taken along the line 4—4 thereof and shown with parts removed for clarity;

FIG. 5 is an exploded perspective view of the bearing of the present invention;

FIG. 6 is an enlarged sectional view of FIG. 2 taken along the line 6—6 thereof and shown with parts removed for clarity; and FIG. 7 is a plan view of the assembled bearing in place in the housing.

BROAD STATEMENT OF THE INVENTION

Broadly described, the present invention relates to a tool, a housing defining an elongated cavity, a slide in said cavity and reciprocable therealong and along a longitudinal axis thereof, first and second boss means in said cavity and spaced along said axis, each of said boss means including an opposed pair of surfaces disposed on opposite sides of said slide, bearing means cooperatively engageable with said boss means and slidably supporting and guiding said reciprocating slide, said bearing means and the opposed surfaces on one of said boss means being formed complimentary to one another in their area of engagement and restraining said bearing means against movement longitudinal of said axis, the opposed surfaces on the other of said boss means and said bearing means being formed in their area of engagement to restrain said bearing means against movement transversely of said axis.

DETAILED DESCRIPTION

Referring now specifically to the drawings, a portable power operated sabre saw, which is one installation in which the present invention finds particular use, is illustrated generally at 11 in FIG. 1. However, it is to be understood that this is illustrative only and that the present invention finds general use in devices having a reciprocating slide requiring sliding support.

With this in mind, the saw 11 is seen to include a motor housing 13 and gear housing 15 secured together by screws 17. An electric motor (not shown) is disposed within the housing 13 and is powered from a suitable electric source connected thereto by a line cord 19. A handle 21 is secured to the motor housing 13 and gear housing 15 and is provided with an on-off switch 23 and a reversing switch 25 to control the motor. A cover plate 24 is secured to the gear housing 15 by screws 26 and permits access to the interior thereof for a purpose to be described.

The motor (not shown) has an output shaft 27 which extends into the gear housing 15 and is suported by a bearing 29 carried in a boss 31. The end of the shaft 27 has pinion teeth thereon which drivingly engage a driven gear 33 which is rotatably supported upon the gear housing 15. A crank 35 has one end pivoted to a crank pin 37 carried by the gear 33 while its other end is pivoted by a pin 39 to one end of a connecting rod 41. The other end of the connecting rod 41 is pivoted by a pin 43 to a reciprocating slide 45 to which a saw blade 47 is attached in a suitable fashion. The slide 45 is supported and guided within the housing 15 by novel bearing means 49 hereinafter described.

In use, when the motor (not shown) is energized and turns the motor shaft 27 in a clockwise direction, as seen in FIG. 2, the gear 33 turns counterclockwise so that an abutment pin 51 engages and drives the crank 35. If the motor is reversed, another abutment pin 53 engages and drives the crank 35 as the gear 33 rotates. By properly positioning the pins 51, 53 and the crank pin 37 on the gear 33, reversal of the motor is effective to provide blade strokes of different speed and amplitude. However, this construction forms no part of the present invention and is not described further here. Should further details be desired, reference may be made to the copending application of Thaddeus E. Bednarski, Ser. No. 745,164, filed July 16, 1968, now Pat. No. 3,482,458 issued Dec. 9, 1969 and owned by the assignee of the present application.

The novel bearing means 49, shown in FIGS. 1 and 2 and in greater detail in FIGS. 3–7, comprises a pair of separable, elongated members 55, 57 having relatively deep grooves 59, 61, respectively, throughout their length. These generally channel shaped bearing members 55, 57, when assembled, define an elongated cavity sized to closely but slidably support the reciprocating slide 45. The assembled bearing members 55, 57, at least at their forward portions, fully enclose the slide 45 and a resilient seal 56 surrounds the slide 45 at the forward end of the bearing members 55, 57 to prevent dirt, dust and other foreign matter from being carried by the slide 45 back into the transmission. The bearing members 55, 57 preferably are constructed from a stable material having a relatively low coefficient of friction and good heat dissipation properties. For example, bearing members constructed from sintered powdered iron impregnated with suitable lubricant have been determined to perform satisfactorily.

Since the bearing members 55, 57 support and guide the slide 45 and the latter has the saw blade 47 attached thereto, it is important that these members 55, 57 be securely and accurately fixed within the gear housing 15. To this end, the housing 15 has a pair of dependent, spaced, boss-like projections 63, 65 formed integral therewith and which have opposed arcuate faces 67, 69, respectively, formed thereon. The bearing members 55, 57 have arcuately shaped, lateral projections 71, 73 which are adapted to fit snugly within the recess defined by the bosses 63, 65 and engage the arcuate faces 67, 69, respectively.

The housing 15 has another pair of dependent projections 75, 77 spaced rearwardly of the projections 71, 73. The pojections 75, 77 also define a recess and are adapted to snugly receive a small pair of projections 79, 81 on the bearing members 55, 57. The cooperating projections 75, 77 and 79, 81 on the housing 15 and bearing members 55, 57, respectively, are not complementary and are intended only to stabilize the bearing members 55, 57 in their mounting between the bosses 63, 65. Thus, the dimensional distance from the projections 71, 73 to the projections 75, 77, and that from the projections 71, 73 to the projections 79, 81 need not be held to close tolerances.

The bearing members 55, 57 are assembled to the gear housing 15 through the bottom opening made accessible by removing the cover plate 24. Thus, with the housing 15 inverted, the upper bearing part 55 is first dropped in place between the bosses 63, 65 and 75, 77 and seats against abutment shoulders 80, 82. The assembled linkage, which comprises crank 35, connecting rod 41 and slide 45, is then dropped into place so that slide 45 lays in groove 59, and the crank 35 is thereafter connected to crank pin 37. The lower bearing part 57 is then placed so that it is aligned with bearing part 55 and its projections 71, 73 and 79, 81 are between bosses 63, 65 and 75, 77, respectively. These parts are then secured in place by one or a pair of screws 83, 85 which extend through the projections 71, 73 in the bearing parts 55, 57 and are threaded into the bosses 63, 65, as shown in FIG. 3. Finally, the cover plate 24 is secured in place on the housing 15 by screws 26. As seen, the cover plate 24 has spaced projections 88 which engage the lower bearing point 57 to stabilize and rigidify the bearing parts 55, 57 in the housing 15. Alternatively, strap means (not shown) could be employed to stabilize the bearing parts 55, 57 in the housing 15.

It will be appreciated that as the slide 45 reciprocates, the connecting rod 41 undergoes compound movement made up of reciprocation and pivotal movement. To accommodate this movement, the bearing members 55, 57 are cut away along a portion of their length to define laterally opening slots 87, 89. In addition, the bearing members 55, 57 are grooved at 91, 93, respectively, to accommodate reciprocation of the pin 43 which connects the connecting rod 41 and the slide 45.

By the foregoing, there has been disclosed a novel slide member bearing and bearing mount calculated to fulfill the inventive objects hereinabove set forth, and while a preferred embodiment of the present invention has been illustrated and described in detail, various additions, modifications, substitutions and omissions may be made thereto without departing from the spirit of the invention as encompassed by the appended claims.

I claim:

1. In a tool, a housing defining an elongated cavity, a slide in said cavity and reciprocable therealong and along a longitudinal axis thereof, first and second boss means in said cavity and spaced along said axis, each of said boss means including an opposed pair of surfaces disposed on opposite side of said slide, bearing means cooperatively engageable with said boss means and slidably supporting and guiding said reciprocating slide, said bearing means and the opposed surfaces on one of said boss means being formed complimentary to one another in their area of engagement and restraining said bearing means against movement longitudinal of said axis, the opposed surfaces on the other of said boss means and said bearing means being formed in their area of engagement to restrain said bearing means against movement transversely of said axis.

2. A construction as defined in claim 1 wherein said bearing means includes first and second bearing members each of which cooperatively engages said boss means surfaces.

3. A construction as defined in claim 2 wherein said bearing members are generally channel shaped in cross section.

4. A construction as defined in claim 2 wherein said bearing members are formed of lubricant impregnated, sintered powdered metal.

5. A construction as defined in claim 1 wherein said housing includes detachably secured first and second parts, said boss means being formed in said first housing part, said bearing means being removable from said housing upon detachment of said housing second part.

6. A construction as defined in claim 1 wherein said bearing means is formed with lateral projection means spaced along said axis and cooperatively engageable with said opposed boss surfaces.

7. A construction as defined in claim 1 wherein said opposed surfaces of said one boss means are arcuate in configuration.

8. A construction as defined in claim 5 wherein said bearing means includes detachable first and second bearing members secured together and to said first housing part by fastener means readily accessible when said second housing part is detached from said first housing part.

9. A construction as defined in claim 8 wherein said second housing part has means thereon engaging one of said bearing members when secured in place on said first houing part to stabilize said bearing members.

References Cited

UNITED STATES PATENTS

| 2,631,619 | 3/1953 | Folli | 143—68 |
| 2,722,244 | 11/1955 | Schultz | 143—68X |
| 2,897,024 | 7/1959 | Chenea. | |
| 3,350,143 | 10/1967 | Lichowsky. | |

D. R. SCHRAN, Primary Examiner

U.S. Cl. X.R.

143—68